United States Patent [19]

Inoue et al.

[11] Patent Number: 4,709,281
[45] Date of Patent: Nov. 24, 1987

[54] DATA TRANSFER APPARATUS FOR USE WITH A MAGNETIC DISK CARTRIDGE

[75] Inventors: Kazuhiko Inoue, Tokyo; Tsutomu Kawasaki, Iruma; Toshio Ihana, Tokorozawa, all of Japan

[73] Assignee: Teac Corporation, Tokyo, Japan

[21] Appl. No.: 746,373

[22] Filed: Jun. 19, 1985

[30] Foreign Application Priority Data

Jun. 28, 1984 [JP] Japan ................................. 59-133547

[51] Int. Cl.[4] ...................... G11B 19/04; G11B 19/10; G11B 25/04
[52] U.S. Cl. ......................................... 360/97; 360/99
[58] Field of Search ................................. 360/97–99, 360/86, 105, 137; 369/261

[56] References Cited

U.S. PATENT DOCUMENTS

| 4,393,424 | 7/1983 | Vidwans | 360/97 X |
| 4,419,703 | 12/1983 | Gruczelak et al. | 360/97 |
| 4,509,086 | 4/1985 | Hickethier et al. | 360/99 |
| 4,577,249 | 3/1986 | Cantwell | 360/99 |
| 4,602,306 | 7/1986 | Noda | 360/97 X |

FOREIGN PATENT DOCUMENTS 58-77080  5/1983  Japan .
59-90260A 5/1984  Japan ................................. 369/261

Primary Examiner—John H. Wolff
Attorney, Agent, or Firm—Woodcock Washburn Kurtz Mackiewicz & Norris

[57] ABSTRACT

A flexible magnetic disk, rotatably housed in an apertured envelope to make up a disk cartridge, is loaded through an entrance slot in the housing of the apparatus to a preassigned position for data transfer with a pair of transducer heads on its opposite sides. Upon subsequent manipulation of a clamp know, one of the transducer heads is sprung into forced contact with the other transducer head via the magnetic disk therebetween. In order to avoid the direct contact of the two transducer heads as a result of the user's tampering with the clamp knob when the disk cartridge is not loaded in the apparatus, a head control mechanism is provided for holding the transducer heads away from each other when the disk cartridge is not loaded, even if the clamp assembly is then actuated inadvertently. The head control mechanism allows the one transducer head to travel toward the other for the establishment of data transfer contact with the magnetic disk only when the clamp knob is actuated following the insertion of the disk cartridge in the entrance slot.

5 Claims, 15 Drawing Figures

DATA TRANSFER APPARATUS FOR USE WITH A MAGNETIC DISK CARTRIDGE

BACKGROUND OF THE INVENTION

Our invention relates to an apparatus for data transfer with disklike record media, and more specifically to an apparatus for the recording and/or reproduction of coded data with use of interchangeable flexible magnetic disks, now commonly referred to as floppy disks, that are used in protective envelopes or jackets to make up disk cartridges. Still more specifically, our invention deals with such a data transfer apparatus of the class having a pair of magnetic heads for data transducing contact with the opposite faces of the magnetic disk.

Flexible magnetic disks may be described as being either single or double sided depending upon whether one or both of its opposite faces are used for data storage. A data transfer apparatus for use with double sided disks or disk cartridges has a pair of magnetic transducer heads. The first of these heads is substantially fixed in a direction normal to the plane of the magnetic disk. The second transducer head is typically mounted on a pivotal head arm for movement therewith into and out of data transfer contact with the magnetic disk. A solenoid is a known example of actuator for such pivotal motion of the head arm. An advantage of this prior art construction is that the head arm can be readily solenoid actuated to move the second transducer head away the magnetic disk for the travel of both heads in its radial direction for track to track accessing, thereby avoiding damage or wear of the disk due to friction that would otherwise be caused by sliding engagement of the disk with both transducer heads. Offsetting this advantage, however, are the longer access time and the higher cost of the apparatus because of the use of the solenoid.

These weaknesses are absent from the data transfer apparatus described and claimed in Japanese Laid Open Patent Application No. 58-77080 filed by Teac Corporation and laid open to public inspection on May 10, 1983. This prior art devices teaches to interlock the second transducer head with the disk clamp mechanism and hence to dispense with the solenoid. The second transducer head is sprung into data transfer contact with the magnetic disk as the clamp mechanism is hand actuated to clamp the disk against the drive hub assembly following the loading of the disk cartridge into the apparatus.

This solution has proved unsatisfactory, however. The user may inadvertently actuate the clamp mechanism when no disk cartridge is loaded in the apparatus. Then the second transducer head, mounted on the pivotal head arm, will be spring energized into direct contact with the first head. Since the opposed faces of both transducer heads have a smooth, mirrorlike finish to offer a minimum friction to the magnetic disk, they will stick together upon direct contact with each other, so firmly that they may not easily come apart. Such direct contact of the transducer heads under spring pressure may also result in the destruction of their gimbal supports.

An obvious remedy for this problem might be to provide some means for inhibiting the operation of the clamp mechanism, even if it is activated manually, when no disk cartridge is loaded in the apparatus. The pair of transducer heads will then not make direct contact with each other. However, such inhibiting means would be overloaded and ruined if the user inadvertently activated the clamp mechanism without previously loading a disk cartridge in the apparatus. The inhibiting means might of course be made rugged enough to withstand such excessive loading but then would add to the cost of the data transfer apparatus. The provision of the inhibiting means is further objectionable as such means make difficult the readjustment or repair of the clamp mechanism, the later being unactuable unless the disk cartridge is loaded.

SUMMARY OF THE INVENTION

We have hereby found a truly satisfactory solution to the problem of how to avoid, in a data transfer apparatus of the kind defined, the direct contact of the pair of magnetic transducer heads with each other. In devising this solution, moreover, we have made possible the manual actuation of the clamp mechanism regardless of whether a disk cartridge is loaded in the apparatus or not, in order to expedite the readjustment or repair of the clamp mechanism and associated means. We further provide, in an effective, working combination with the means for preventing the direct contact of the transducer heads, means for guiding the disk cartridge to a preassigned data transfer position within the apparatus so as not to strike the transducer heads on the way.

Stated in brief, the data transfer apparatus in accordance with our invention includes a housing having an entrance opening for the insertion and withdrawal of a magnetic disk cartridge to and from a predetermined data transfer position therein. Mounted within the housing are a drive hub assembly and a clamp assembly which are disposed on the opposite sides of the disk cartridge in the data transfer position. A clamp actuating mechanism is actuable manually for actuating the clamp assembly between an unclamping position, where the clamp assembly is away from the drive hub assembly to allow the insertion and withdrawal of the disk cartridge into and from the housing, and a clamping position where the clamp assembly engages between itself and the drive hub assembly the magnetic disk of the disk cartridge in the data transfer position. A first transducer head is mounted directly on a carriage thereby to be transported radially of the magnetic disk of the disk cartridge being held in the data transfer position. A second transducer head is mounted on a head arm which in turn is pivotally mounted on the carriage for movement between a retracted position, where the second transducer head is away from the disk cartridge in the data transfer position, and a working position where the second transducer head urges the magnetic disk of the disk cartridge against the first transducer head for the establishment of data transfer contact of the magnetic disk with both first and second transducer heads. The head arm is sprung or otherwise biased from the retracted toward the working position. Also included is a head control mechanism for holding the head arm in the retracted position against the effect of the biasing means when the disk cartridge is not inserted in the housing, even if the clamp assembly is then actuated inadvertently from the unclamping to the clamping position by the clamp actuating mechanism, and for allowing the head arm to pivot on the carriage from the retracted to the working position under the force of the biasing means in response to the actuation of the clamp assembly from the unclamping to the clamping position by the clamp actuating mechanism following the insertion of the disk cartridge in the housing toward the data transfer position.

Preferably, the head control mechanism comprises a head control lever operatively engaged with the head arm for controlling the movement of the second transducer head into and out of forced contact with the magnetic disk, and a cam acting on the head control lever in response to the loading of the disk cartridge in the apparatus. The head control lever is further associated with the clamp actuating mechanism to allow the head arm to bring the second transducer head into contact with the magnetic disk only when the disk cartridge is loaded in the apparatus and the clamp assembly actuated to the clamping position.

We have thus redesigned the data transfer apparatus so that the second transducer head stays away from the first transducer head despite an inadvertent manual actuation of the clamp assembly if then the apparatus is not loaded with a disk cartridge. The clamp assembly itself, however, can be actuated into engagement with the drive hub assembly even if the apparatus is not loaded. It is therefore easy to readjust or repair, as necessary, the clamp actuating mechanism, clamp assembly and associated means. It will also be appreciated that there is absolutely no possibility of the head control mechanism being overloaded by the clamp actuating mechanism because the head control mechanism does not inhibit the actuation of the clamp assembly. Consequently, the head control mechanism need not be of such rugged construction as to substantially add to the cost of the data transfer apparatus.

According to a further feature of our invention, the head control mechanism of the foregoing preferred configuration is closely associated with a cartridge guide lever. Pivoted for movement between a guiding and a nonguiding position, the cartridge guide lever functions when in the guiding position to guide the inserted disk cartridge to the data transfer position so as not to hit the nonretractable first transducer head on the way. The provision of the cartridge guide lever is particularly desirable in cases where the first transducer head is spring mounted on the carriage.

We recommend, for a simplicity of construction, the pivotal mounting of both the cartridge guide lever and the head control lever of the head control mechanism on a single lever support. This arrangement further makes it possible to use a single spring for biasing both the cartridge guide lever and the head control lever is predetermined directions.

The above and other features and advantages of our invention and the manner of realizing them will become more apparent, and the invention itself will best be understood, from a study of the following description and appended claims, with reference had to the attached drawings and showing a preferred embodiment of the invention.

DESCRIPTION OF THE PREFERRED EMBODIMENT

General

Figure 5:
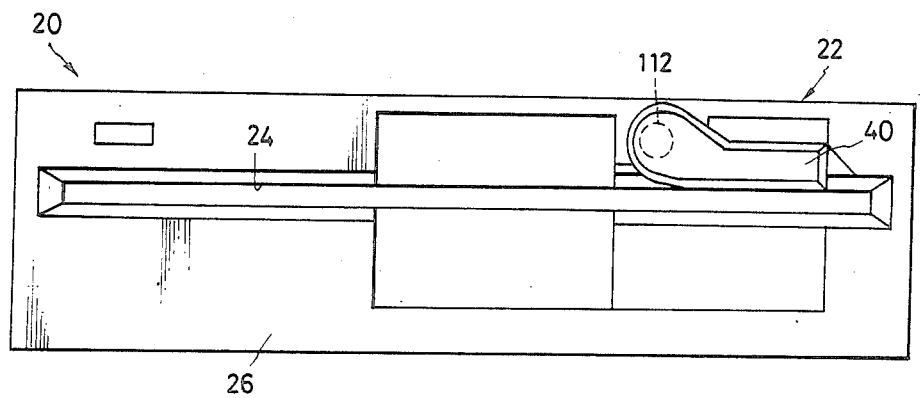
FIG. 5 is a front elevation of the data transfer apparatus, showing a clamp knob on the front face of the apparatus in a disengaging position to hold the clamp assembly away from the drive hub assembly as in FIGS. 1 and 3.
Figure 6:
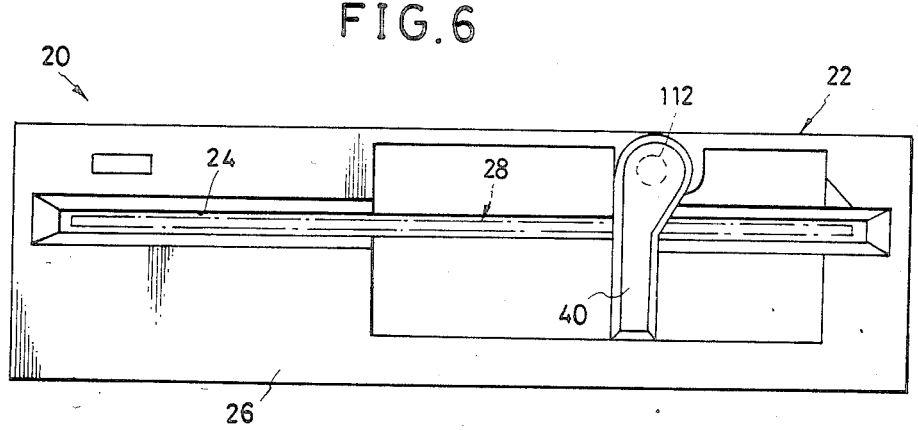
FIG. 6 is a view similar to FIG. 5 except that the clamp knob is shown in an engaging position for clamping the magnetic disk cartridge as in FIG. 4.
Figure 7:
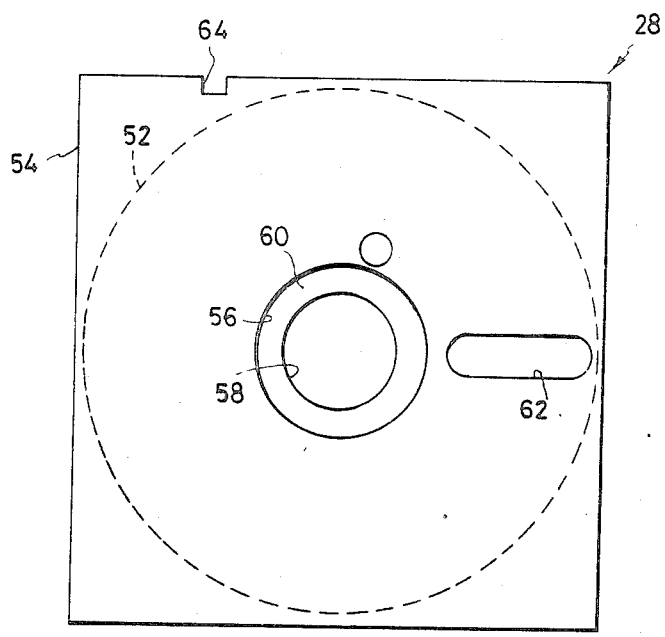
FIG. 7 is a plan of the flexible magnetic disk cartridge for use with the data transfer apparatus of FIGS. 1 through 6, the disk cartridge being shown on a somewhat reduced scale in comparison with its phantom representations in FIGS. 4 and 6.

The data transfer apparatus in accordance with our invention is shown in FIGS. 1 through 6 of the above drawings as adapted for use with the double sided flexible magnetic disk cartridge of FIG. 7. Generally designated 20, the data transfer apparatus broadly comprises:

1. A generally boxlike housing 22 accommodating various working parts of the apparatus hereinafter set forth and having an entrance slot or opening 24, FIGS. 3 through 6, formed in its front face 26 for the insertion and withdrawal of the flexible magnetic disk cartridge 28.

2. A drive hub assembly 30, FIGS. 3 and 4, mounted within the housing 22 and driven by an electric disk drive motor 32 for imparting rotation to the flexible magnetic disk of the disk cartridge 28 in a preassigned data transfer position therefor.

3. A clamp assembly 34 disposed opposite the drive hub assembly 30 and herein shown mounted on a pivotal clamp arm 36 for movement into and out of clamping engagement of the magnetic disk of the disk cartridge 28 against the drive hub assembly.

4. A clamp actuating mechanism 38, FIGS. 1 and 2, including a clamp knob or lever 40, FIGS. 5 and 6, for manually activating the clamp assembly 34 into and out of clamping engagement with the drive hub assembly 30.

5. A first or lower magnetic transducer head 42, FIGS. 3 and 4, disposed under the disk cartridge 28 being held in the data transfer position for data transfer contact with the lower face of the magnetic disk and mounted directly on a carriage 44 thereby to be transported radially of the magnetic disk.

6. A second or upper magnetic transducer head 46, FIGS. 1 through 4, disposed over the disk cartridge 28 being held in the data transfer position, and mounted on a head arm 48, pivoted on the carriage 44, thereby to be moved into and out of data transfer contact with the upper face of the magnetic disk.

7. A head control mechanism 50, FIGS. 1 and 2, operatively engaged with the head arm 48 to allow the upper transducer head 46 to move into data transfer contact with the magnetic disk only upon actuation of the clamp assembly 34 following the insertion of the disk cartridge 28 into the entrance slot 24.

We will hereinafter discuss in more detail the above listed parts and components of the data transfer apparatus 20, as well as the flexible magnetic disk cartridge 28 for use therewith, under the respective headings. The operational description of the complete apparatus will follow the detailed discussion of the individual parts and components.

Flexible Magnetic Disk Cartridge

As illustrated in FIG. 7, the disk cartridge 28 includes a flexible magnetic disk 52 that allows information to be encoded on ane readable from both of its opposite faces. The magnetic disk 52 is rotatably enclosed in a generally square envelope or jacket 54 to make up the disk cartridge 28. The envelope 54 has formed in each of its opposite surfaces a central aperture 56 larger than a concentric central aperture 58 in the magnetic disk 52, thus exposing an annular portion 60 of the disk to be captured between the drive hub assembly 30 and the clamp assembly 34 as in FIG. 4. Also formed in each surface of the envelope 54 is an elliptical opening or slot 62 which exposes a radial portion of the magnetic disk 52 for accessing by either of the pair of magnetic transducer heads 42 and 46. At 64 is seen a file protect notch conventionally formed in a marginal edge portion of the envelope 54.

Housing

With reference again to FIGS. 1 through 6 the housing 22 of the data transfer apparatus 20 comprises a frame 66 and integral front 68 and bottom 70 walls, which may all be aluminum die castings and which are all combined into a generally flat, boxlike shape. The frame 66 includes a partition or platform 72, FIGS. 3 and 4, dividing the interior of the housing 22 into an upper chamber 74 and a lower chamber 76. The upper chamber 74 accommodates the drive hub assembly 30, clamp assembly 34, transducer heads 42 and 46, head control mechanism 50, etc., whereas the lower chamber 76 has the disk drive motor 32 mounted therein.

Figure 2:
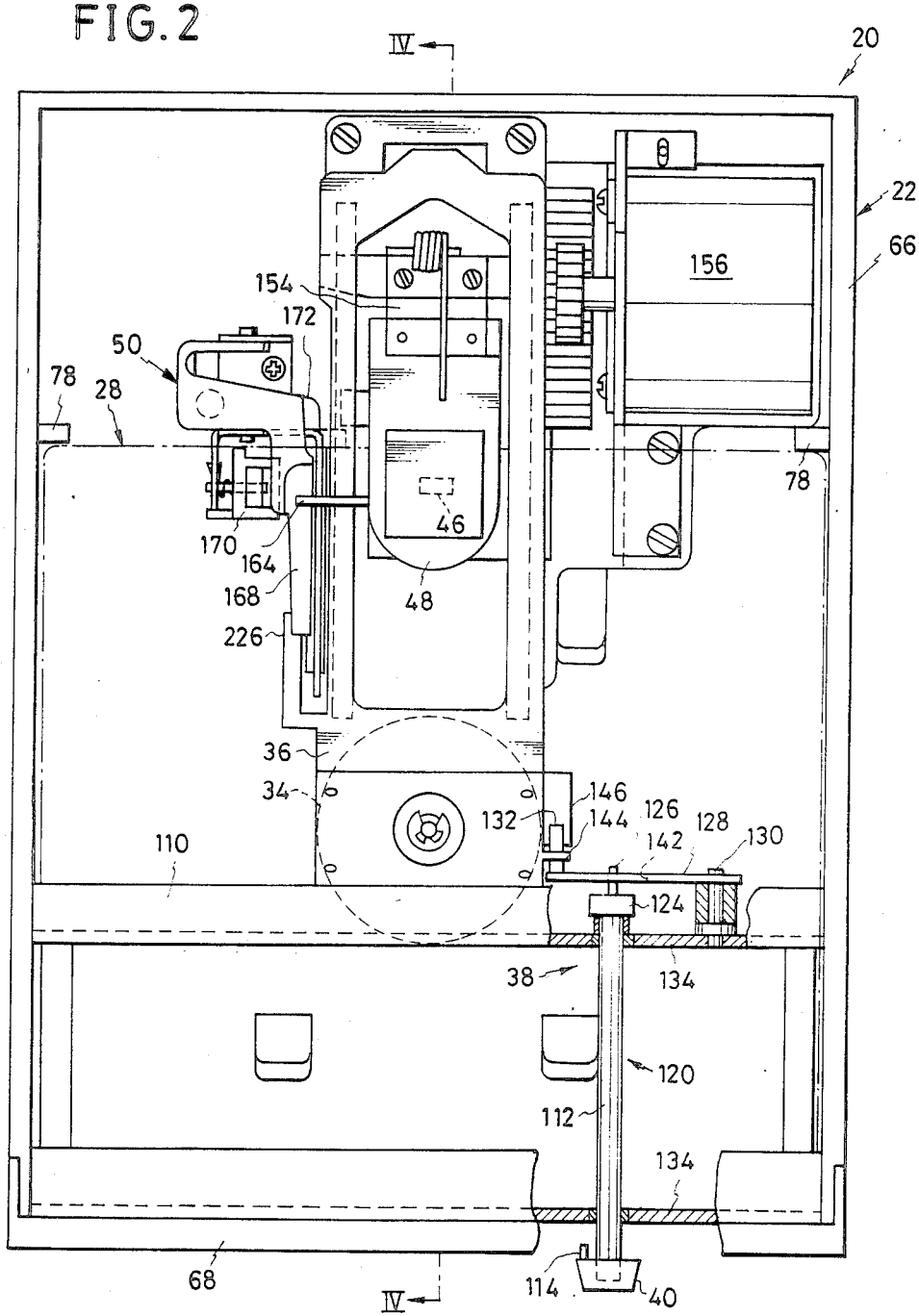
FIG. 2 is a view similar to FIG. 1 except that the apparatus is shown with its clamp actuating mechanism operated to clamp a magnetic disk cartridge (not shown) in position therein.
Figure 4:
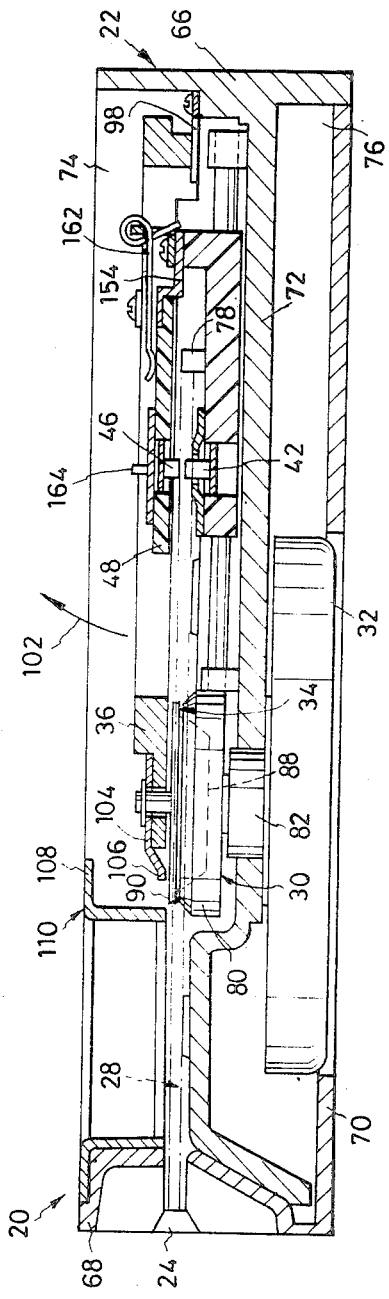
FIG. 4 is also a vertical section through the data transfer apparatus, taken along the line IV—IV in FIG. 2 and shown in the same state as in FIG. 2.

The front wall 68 provides the aforesaid front face 26 in which there is defined the entrance slot 24 for the insertion and withdrawal of the disk cartridge 28 to and from the data transfer position indicated by the dashed lines in FIGS. 2 and 4. Inserted fully into and through the entrance slot 24, the disk cartridge 28 reaches the data transfer position on butting on a pair of stops 78 shown also in FIGS. 2 and 4.

Drive Hub Assembly

Figure 3:
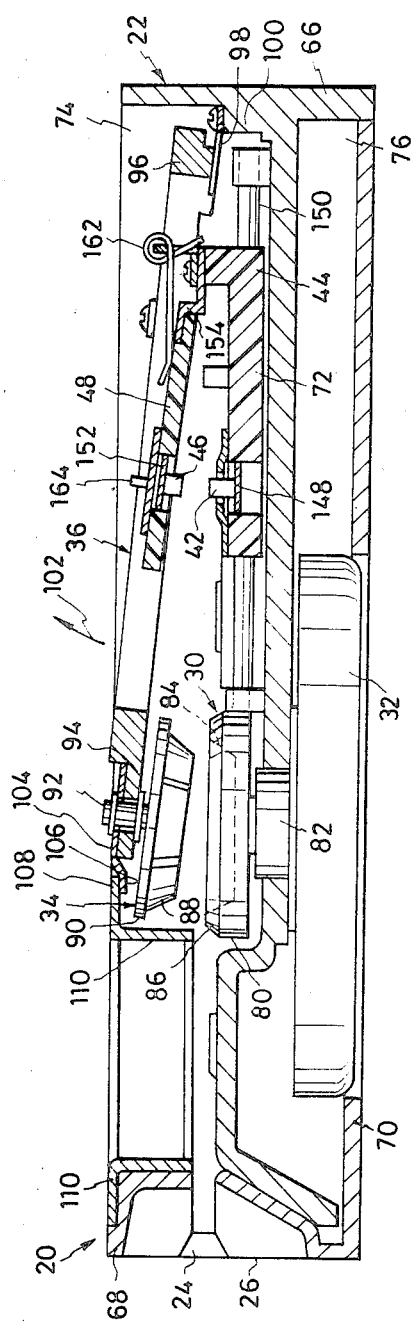
FIG. 3 is a vertical section through the data transfer apparatus, taken along the line III—III in FIG. 1 and shown in the same state as in FIG. 1.

The drive hub assembly 30 is seen in both FIGS. 3 and 4. It includes a drive hub 80 therein shown mounted directly on the output shaft of the disk drive motor 32 thereby to be rotated about the same axis as the magnetic disk of the disk cartridge 28 being held in the data transfer position. The disk drive motor 32 is mounted to the partition 72 of the housing 22 via a bearing 82. The drive hub 80 has a conical socket 84 formed in its top surface for engagement with the clamp assembly 34 in a manner yet to be described. The annular top surface 86 of the drive hub 80, left around the socket 84, is intended for direct contact with the exposed annular surface 60, FIG. 7, of the magnetic disk 52 in its data transfer position.

Clamp Assembly

As shown also in FIGS. 3 and 4, the clamp assembly 34 lies on the opposite side of the disk cartridge 28, when the latter is in the data transfer position, with respect to the drive hub assembly 30. The clamp assembly 34 includes a conical collet 88, complete with a flange or shoulder 90, rotatably mounted on a spindle 92 on the free front end 94 of the clamp arm 36. Sleeved upon the spindle 92, a helical compression spring, not shown, urges the flanged collet 88 away from the clamp arm 36 and toward the drive hub assembly 30.

Figure 1:
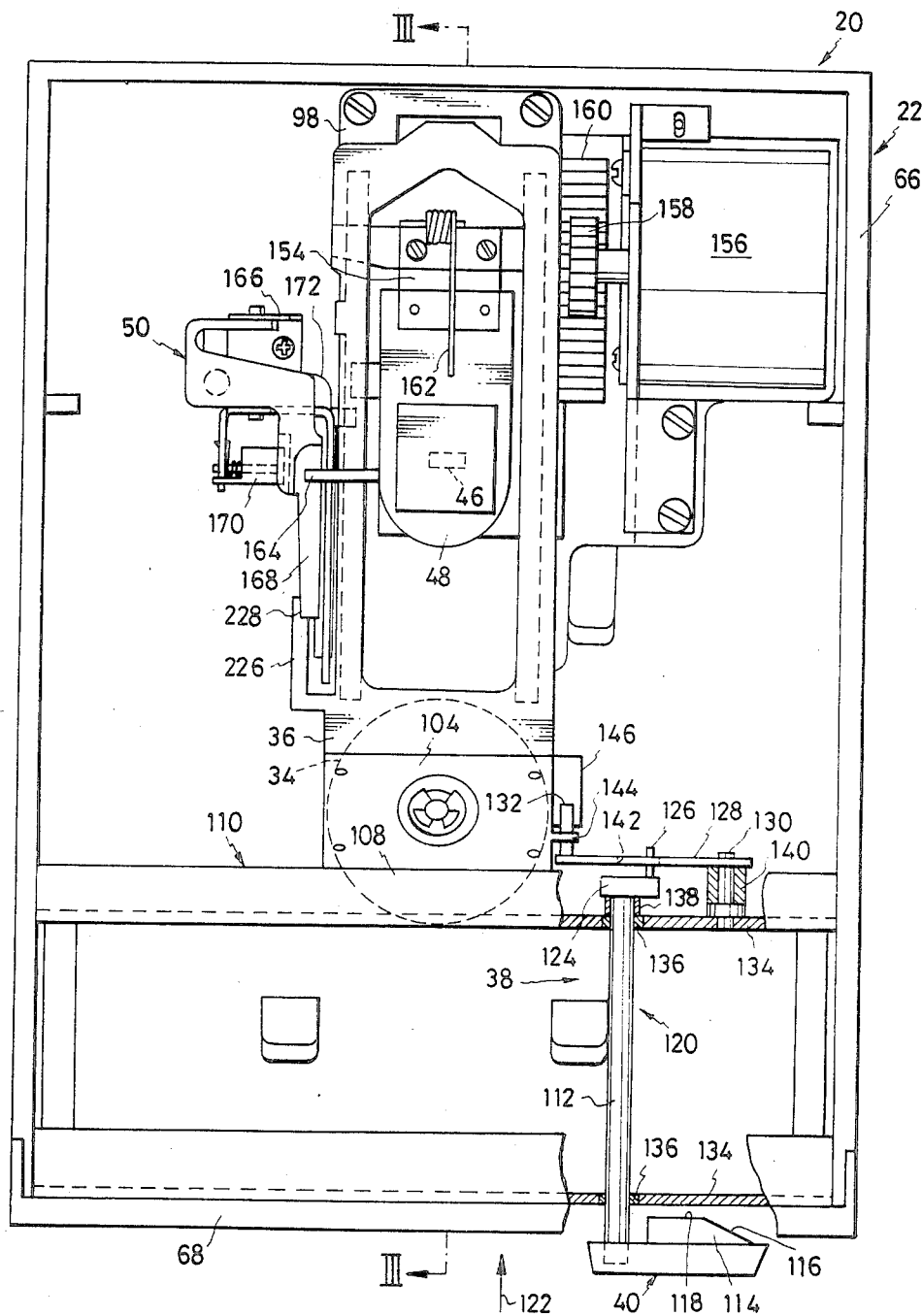
FIG. 1 is a plan, partly broken away and shown in section for clarity, of the data transfer apparatus constructed in accordance with our invention, the apparatus being shown with its top cover (not shown) removed to reveal the inner details and being further shown with its clamp actuating mechanism unactuated to hold the clamp assembly away from the drive hub assembly.

As will be seen also from FIGS. 1 and 2, the clamp arm 36 is supported at its rear end 96 by a cantilever spring 98 on a ledge 100 formed on the rear wall of the housing 22. So supported, the clamp arm 36 is pivotable between an unclamping position of FIG. 3 and a clamping position of FIG. 4. The cantilever spring 98 serves the purpose of biasing the clamp arm 36 from the clamping toward the unclamping position, as indicated by the arrow 102 in FIGS. 3 and 4, in addition to that of hingedly mounting the clamp arm on th ledge 100. A piece of sheet metal 104 is fastened to the free end 94 of the clamp arm 36 to provide a forward extension 106 of the clamp arm. When the clamp arm 36 is pivoted in a clockwise direction, as viewed in FIGS. 3 and 4, under the bias of the cantilever spring 98, its forward extension 106 comes into abutment against an overhanging portion 108 of a wall member 110 fastened to the frame 66, thereby limiting the clockwise turn of the clamp arm 36 in the unclamping position of FIG. 3.

When the clamp arm 36 is in the unclamping position of FIG. 3, the clamp assembly 34 is out of engagement with the drive hub assembly 30. The clamp assembly 34 is then spaced from the drive hub assembly 30 a sufficient distance to permit the insertion of the disk cartridge 28 into and through the entrance slot 24 to the data transfer position. The clamp arm 36 is to be pivoted from the unclamping to the clamping position, by the clamp actuating mechanism 38 to be detailed subsequently, following the loading of the disk cartridge 28. In the clamping position of the clamp arm 36 represented in FIG. 4, the conical collet 88 of the clamp assembly 34 becomes engaged in the correspondingly shaped socket 84 in the drive hub 80 through the central aperture 58, FIG. 7 in the magnetic disk 52. Also, in this clamping position, the flange 90 on the collet 88 holds the exposed annular portion 60 of the magnetic disk 52 against the annular surface 86 of the drive hub 80. Thus is the magnetic disk 52 captured fast between drive hub assembly 30 and clamp assembly 34, so that it can be revolved within the envelope 54 upon rotation of the disk drive motor 32.

Clamp Actuating Mechanism

The clamp actuating mechanism 38 shown in FIGS. 1 and 2 includes the clamp knob or lever 40 seen also in FIGS. 5 and 6. The clamp knob 40 is rigidly mounted at one end on a rotary shaft 112, disposed immediately above the entrance slot 24, for pivotal motion between a disengaging position of FIG. 5 and an engaging position of FIG. 6. When in the disengaging position, the clamp knob 40 is oriented approximately parallel to the entrance slot 24, holding the clamp arm 36 in the unclamping position under the force of the cantilever spring 98 as in FIG. 3. The clamp knob 40 allows, of course, the insertion and withdrawal of the disk cartridge 28 into and out of the entrance slot 24.

When turned 90 degrees in a clockwise direction to the engaging position of FIG. 6, the clamp knob 40 causes the clamp arm 36 to pivot from the unclamping to the clamping position against the force of the cantilever spring 98. In this engaging position the clamp knob 40 extends across the entrance slot 24 and so blocks same against the inadvertent forced withdrawal of the disk cartridge 28 or the insertion of another disk cartridge.

As clearly seen in FIG. 1, the clamp knob 40 has a pusher cam 114 projecting rearwardly, or toward the housing 22, therefrom and generally extending longitudinally of the clamp knob. The pusher cam 114 has a sloping edge 116 and nonsloping edge 118 for direct sliding contact with the trailing edge of the envelope 54 of the disk cartridge 28 being inserted in the entrance slot 24. The pusher cam 114 will serve no useful purpose if the disk cartridge 28 is manually inserted fully into the entrance slot 24, that is, into abutment against the pair of limit stops 78. The user may, however, incompletely insert disk cartridge 28. Then, upon subsequent manipulation of the clamp knob 40 from the disengaging to the engaging position, the pusher cam 114 will slidingly engage the partly protruding disk cartridge 28 with its sloping edge 116 and will push same fully into the entrance slot. The nonsloping edge 118 of the pusher cam 114 will function to hold the disk cartridge 28 fully received in the apparatus 20 in the engaging position of the clamp knob 40.

The clamp knob 40 is coupled to the clamp arm 36 via a linkage 120 shown in FIGS. 1 and 2. This linkage functions to cause the pivotal motion of the clamp arm 36 between the clamping and unclamping positions in response to the manual activation of the clamp knob 40 between the engaging and disengaging positions. The linkage 120 comprises:

1. The noted rotary shaft 112 having the clamp knob 40 rigidly mounted on its front end and extending in the arrow marked direction 122, FIG. 1, in which the disk cartridge 28 is to be manipulated into and out of the entrance slot 24.

2. A crank web 124 on the rear end of the rotary shaft 112.

3. A crankpin 126 projecting from the crank web 124 in an offset relation to the rotary shaft 112.

4. A lever 128 proximally pivoted on a pin 130 affixed to the wall member 110, the lever being further operatively engaged at its midportion with the crankpin 126 and having a pin 132 planted on its distal end for engagement with the clamp arm 36.

The rotary shaft 112 extends through the two confronting portions 134 of the wall member 110 and is thereby rotatably supported via sleeve bearings 136. A sleeve 138 is fitted by way of a spacer over that portion of the shaft 112 which projects rearwardly of the rear upstanding wall portion 134. Another sleeve 140 is fitted over the pivot pin 130 of the lever 128 for the same purpose. Although not clearly seen in FIGS. 1 and 2, a slot 142 is formed longitudinally in the midportion of the lever 128 for slidably receiving the crankpin 126 on the crank web 124. Thus, with the manual turn of the clamp knob 40, the crankpin 126 slides along the slot 142 thereby causing the pivotal motion of the lever 128 in a vertical plane. The slot 142 is longitudinally dimensioned to limit the sliding movement of the crankpin 126 in the engaging and disengaging positions of the clamp knob 40. The pin 132 on the distal end of the lever 128 is operatively engaged between two lateral projections 144 and 146 of the clamp arm 36. These lateral projections are spaced from each other in the thickness direction of the clamp arm 36 and are formed integral with the piece of sheet metal 104 thereon.

As the clamp knob 40 extends horizontally in its disengaging position as in FIGS. 1 and 5, so does the crank web 124 on the rotary shaft 112. Then the crankpin 126 lies at the right hand extremity, as seen in this figure, of the slot 142, with the result that the lever 128 extends approximately horizontally. The clamp arm 36 is then in the unclamping position, with its forward extension 106 abutting against the overhang 108 of the wall member 110 under the force of the cantilever spring 98.

The crankpin 126 slides along the slot 142 in the lever 128 with the turn of the clamp knob 40 from the disengaging toward the engaging position. Then, in the engaging position of the clamp knob 40 pictured in FIGS. 2 and 6, the crankpin 126 hits the left hand extremity, as viewed in FIG. 2, of the slot 142. Now the clamp knob 40 and the crank web 124 are both oriented perpendicularly, that is, parallel to the plane along with the clamp arm 36 swings between the clamping and unclamping positions. The lever 128 causes the clamp arm 36 to turn from the unclamping to the clamping position, so that the inserted disk cartridge 28 has its magnetic disk 52 caught between clamp assembly 34 and drive hub assembly 30.

Magnetic Transducer Heads

Referring again to FIGS. 3 and 4 in particular, we will briefly explain the magnetic transducer heads 42 and 46 together with means more or less directly associated therewith. The lower transducer head 42 is mounted on the carriage 44 via a gimbal spring 148. The carriage 44 is slidably mounted on a pair of guide rails 150, one seen in FIGS. 3 and 4, extending radially of the magnetic disk of the disk cartridge 28 in its data transfer position, or in the direction in which the disk cartridge is inserted in and withdrawn from the apparatus.

The upper transducer head 46, on the other hand, is mounted to the head arm 48 via a gimbal spring 152. The head arm 48 is hingedly mounted on the carriage 44 via a cantilever spring 154. It is thus seen that both lower 42 and upper 46 transducer heads are movable radially of the magnetic disk of the disk cartridge 28 being held in the data transfer position, for accessing the individual tracks on the disk. Adopted for such travel of the transducer heads is an electric head transport motor 156 having a pinrack 158 on its output shaft for driving engagement with a rack 160 attached to the carriage 44. Of course, we could employ other types of rotary to linear converters such as a lead screw or a steel belt wound into the shape of the Greek alpha.

Hingedly mounted as above on the carriage 44, the head arm 48 is pivotable between a retracted position of FIG. 3 and a working position of FIG. 4. When in the retracted position the head arm 48 holds the upper transducer head 46 away from the lower transducer head 42 and, on being pivoted to the working position, urges the upper transducer head against the lower transducer head via the magnetic disk slidably engaged therebetween, with the consequent establishment of data transfer contact between magnetic disk and both transducer heads. A torsion spring 162 coacts with the cantilever spring 154 to bias the head arm 48 from the retracted toward the working position.

Normally, despite the forces of the springs 154 and 162, the head arm 48 lies in the retracted position, as in FIG. 3, as a pin 164 projects laterally therefrom into an overlying relation not only with the clamp arm 36 but also with the head control mechanism 50, as will be better understood from a consideration of FIGS. 1 and 2. Thus, even if the clamp arm 36 is pivoted from the unclamping position of FIG. 3 to the clamping position of FIG. 4 by the clamp actuating mechanism 38 including the clamp knob 40, the head arm 48 is not sprung to the working position unless the head control mechanism 50 has been tripped by the disk cartridge 28 loaded in the apparatus 20, as will be understood from the following detailed discussion of the head control mechanism 50.

Head Control Mechanism

We have illustrated the head control mechanism 50 in detail in FIGS. 8 through 15. The head control mechanism 50 as incorporated in this data transfer apparatus 20 functions not only to control the movement of the upper transducer head 46 into and out of engagement with the magnetic disk but also to guide the inserted disk cartridge 28 to the data transfer position so as not to hit the lower transducer head 42. We should have therefore called it, more aptly, a head control and cartridge guide mechanism.

Figure 8:
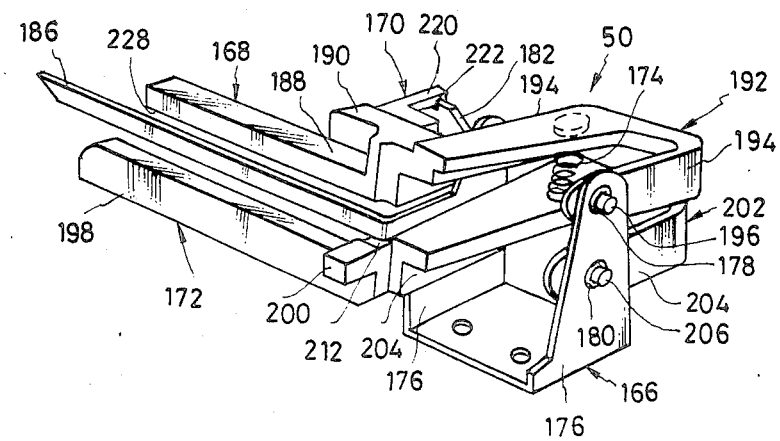
FIG. 8 is an enlarged perspective view of the head control mechanism, as well as of the cartridge guide means incorporated therewith, in the data transfer apparatus of FIGS. 1 through 6.
Figure 9:
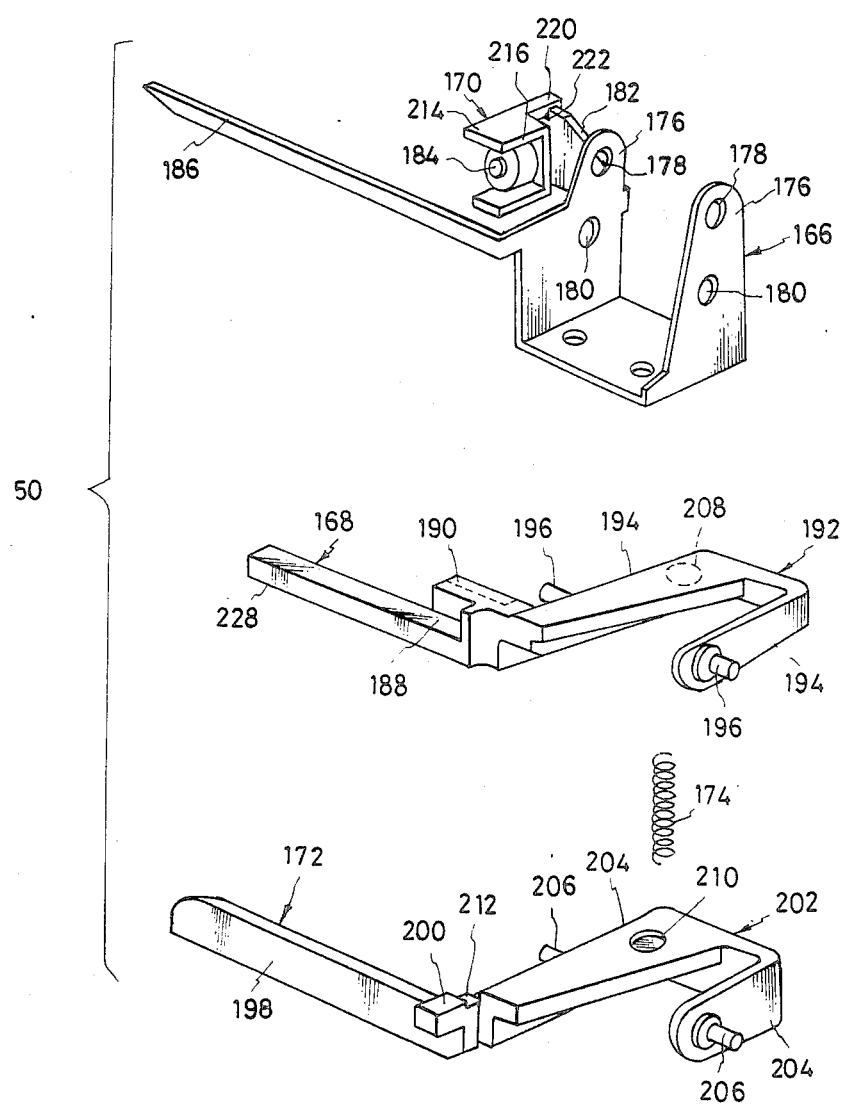
FIG. 9 is an exploded perspective view of the head control mechanism.

As best seen in both FIGS. 8 and 9, the head control mechanism 50 broadly comprises:

1. A lever support 166 fixedly mounted on one side of the clamp arm 36.

2. A head control lever 168 mounted on the lever support 166 for pivotal motion between a head retaining position of FIGS. 10 through 12, for retaining the head arm 48 in the retracted position, and a head releasing position of IGS. 13 through 15 for allowing the head arm to pivot to the working position.

3. A rotary cam 170 for holding the head control lever 168 in the head retaining position when the disk cartridge 28 is not loaded, and for conditioning the head control lever for movement toward the head releasing position when the cam is acted upon the the disk cartridge inserted in the entrance slot 24.

4. A cartridge guide lever 172 mounted on the lever support 166 for pivotal motion between a guiding position of FIGS. 10 through 12, where the disk cartridge 28 on insertion in the entrance slot 24 is guided to the data transfer position so as to avoid collision with the lower transducer head 42, and a nonguiding position of FIGS. 13 through 15 where the disk cartridge is allowed to make data transfer contact with the lower transducer head in the data transfer position.

5. A helical compression spring 174 acting between head control lever 168 and cartridge guide lever 172 for biasing the former from the head retaining position toward the head releasing position and the latter from from the nonguiding position toward the guiding position.

The lever support 166 is U shaped, including a pair of upstanding, confronting walls 176. We recommend metal as a material for the lever support 166. The pair of confronting walls 176 of the lever support have two pairs of aligned holes 178 and 180 defined therein. A cam support 182 is formed integral with the lever support 166 for rotatably supporting the cam 170 via a shaft 184 extending horizontally and at right angles with the arrow marked direction 122, FIG. 1, in which the disk cartridge 28 is to be inserted in the entrance slot 24. Also formed integral with the lever support 166 is a fixed cartridge guide 186 extending parallel to the cartridge guide lever 172 and coacting therewith for guiding the disk cartridge 28 to and from the data transfer position.

Whereas the lever support 166 is preferably metal made as aforesaid, both head control lever 168 and cartridge guide lever 172 can be molded of a plastic, for the reasons hereinafter made apparent. The head control lever 168 integrally comprises:

1. A lever proper 188 extending alongside the clamp arm 36 and unerlying the pin 164 on the head arm 48 for direct engagement therewith, as will be seen from FIGS. 1 and 2.

2. A cam follower portion 190 to be acted upon by the cam 170.

3. A base portion 192 pivotally engaged between the pair of contronting walls 176 of the lever support 166.

The base portion 192 of the head control lever 168 is substantially U shaped, including a pair of opposed limbs 194 having a pair of aligned trunnions 196 projecting outwardly therefrom. These trunnions are rotatably engaged one in each of the pair of aligned holes 178 in the lever support 166, so that the head control lever 168 is pivotable between the head retaining and head releasing positions about the axis of the trunnions 196 with respect to the lever support 166. The pivotal mounting of the head control lever 168 on the lever support 166 is easy as the opposed limbs 194 of the head control lever base portion 192 are elastically deformable toward each other by the application of a hand pressure, the head control lever 168 being a plastic molding as aforesaid. The hand pressure on the limbs 194 may be released after holding the trunnions 196 in axial alignment with the holes 178. The axis about which the head control lever 168 pivots is parallel to the arrow marked direction 122, FIG. 1, of disk cartridge insertion and withdrawal into and out of the apparatus 20.

The cartridge guide lever 172, another plastic molding, integrally comprises:

1. A lever proper 198 for slidingly guiding the inserted disk cartridge 28 to the data transfer position when the cartridge guide lever 172 is in the guiding position of FIGS. 10 through 12.

2. A lug 200 protruding laterally from the lever proper 198 into an underlying relation with the clamp arm 36.

3. A base portion 202 pivotally engaged between the pair of contronting walls 178 of the lever support 166.

The cartridge guide lever base portion 202 is also substantially U shaped, including a pair of opposed limbs 204 having a pair of aligned trunnions 206 projecting outwardly therefrom. These trunnions are rotatably engaged one in each of the pair of holes 180 in the confronting walls 176 of the lever support 166. The cartridge guide lever 172 is therefore pivotable between the guiding and nonguiding positions about the axis of the trunnions 106, which axis is parallel to the axis about which the head control lever 168 pivots on the lever support 166. It is self evident that the cartridge guide lever 172 can be pivoted on the lever support 166 just as easily as the head control lever 168 can be pivoted thereon.

FIG. 9 indicates that the head control lever 168 has formed on its base portion 192 a spring seat 208 directed downwardly. Another spring seat 210 is formed on the base portion 202 of the cartridge guide lever 172 and is directed upwardly. The aforesaid compression spring 174 is mounted between these spring seats 208 and 210. This compression spring biases the the head control lever 168 in a counterclockwise direction as viewed in FIG. 1 and in a clockwise direction as viewed in FIG. 12, that is, from the head retaining position toward the head releasing position. Further the compression spring 174 biases the cartridge guide lever 172 in a clockwise direction as viewed in FIG. 8 and in a counterclockwise direction as viewed in FIG. 12, that is, from the nonguiding position toward the guiding position. It should be appreciated that the spring 174 affords a greater simplicity in construction by acting on both levers 168 and 172 for urging them in the prescribed different directions. The cartridge guide lever 172 is normally retained in the guiding position as its edge 212 butts on the lever support 166.

Figure 10:
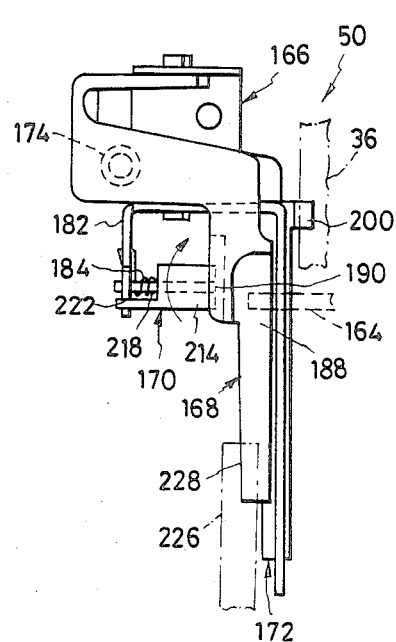
FIG. 10 is a top plan of the head control mechanism, shown with the head control lever in the head retaining position and with the cartridge guide lever in the guiding position.
Figure 11:
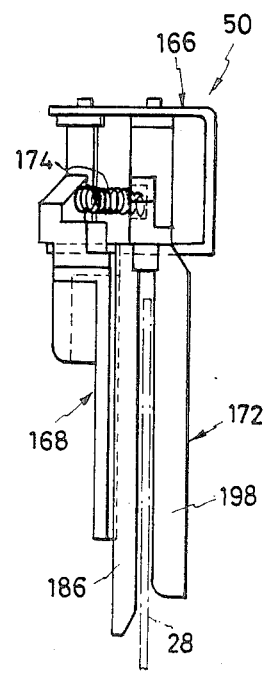
FIG. 11 is a right hand side elevation of the head control mechanism of FIG. 10, shown in the same state as in FIG. 10.
Figure 12:
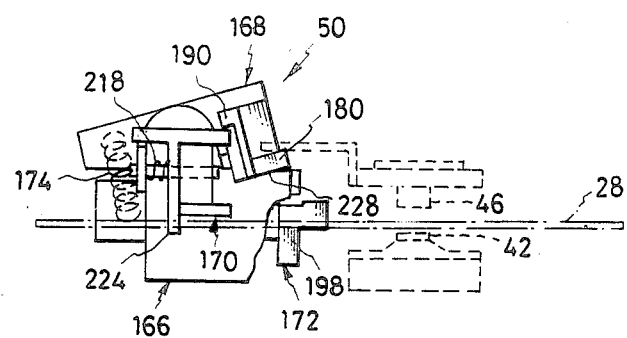
FIG. 12 is a front elevation of the head control mechanism, also shown in the same state as in FIG. 10 or 11.

Normally, or when the disk cartridge 28 is not loaded in the apparatus 20, the cam 170 holds the head control lever 168 in the head retaining position of FIGS. 10 through 12 against the force of the compression spring 174. Upon loading of the disk cartridge 28, the cam 170 conditions the head control lever 168 for movement to the head releasing position, although in fact the head control lever 168 does not travel to the head releasing position until the clamp actuating mechanism 38 is operated subsequently for clamping the loaded magnetic disk.

Rotatably mounted on the shaft 184 on the cam support 182, the cam 170 has a first contact surface 214 for holding the head control lever 168 in the head retaining position of FIGS. 10 through 12, and a second contact surface 216 (herein shown as a pair of spaced apart edges) for holding the head control lever in the head releasing position. The first 214 and second 216 contact surfaces of the cam 170 are angularly spaced 90 degrees from each other, and both are intended for sliding enagagement with the underside of the cam follower portion 190 of the head control lever 168. Sleeved upon the shaft 183, a torsion spring 218 urges the cam 170 in a clockwise direction, as seen in FIG. 9, until its lug 220 hits a limit stop 222 formed by part of the cam support 182. As clearly shown in FIG. 12, the cam 170 has an abutment 224 depending therefrom so as to be abutted upon by the disk cartridge 28 inserted in the entrance slot 24. The disk cartridge 28 on being pushed fully into the entrance slot 24 revolves the cam 170 against the force of the torsion spring 218 from its FIGS. 10 through 12 position to that of FIGS. 13 through 15.

Seen at 226 in FIGS. 1, 2, 10 and 13 is a finger extending laterally from the clamp arm 36 into an underlying relation with the tip 228 of the head control lever 168. The finger 226 is intended to return the head control mechanism 50 to the initial state upon unclamping of the magnetic disk following the completion of data transfer with the transducer heads.

Operation

We have illustrated the data transfer apparatus 20 and its head control mechanism 50 in FIGS. 1, 3, 5, and 10 through 12 in a state wherein the disk cartridge 28 is not loaded and the clamp assembly 34 unactuated, and in FIGS. 2, 4, 6, and 13 through 15 in a state wherein the disk cartridge is loaded and clamped between clamp assembly 34 and drive hub assembly 30.

When the clamp knob 40 is in the disengaging position as in FIGS. 1 and 5, the clamp arm 36 is in the unclamping position of FIG. 3 under the force of the cantilever spring 98. Although energized toward the working position of FIG. 4 by the springs 154 and 162, the head arm 48 stays in the retracted position of FIG. 3 as the pin 164 projecting laterally therefrom rests on both the clamp arm 36, being held in the unclamping position as above, and the head control lever 168 of the head control mechanism 50. The head control lever 168 is now in the head retaining position of FIGS. 10 through 12 as the cam 170 is then unactuated by the disk cartridge 28. The cartridge guide lever 172 is not in the guiding position under the force of the compression spring 174.

The user may insert the disk cartridge 28 in the entrance slot 24 as indicated by the arrow 122 in FIG. 1. The disk cartridge 28 will travel through the space between the fixed cartridge 168 and the cartridge guide lever 172, the latter being now in the guiding position. The cartridge guide lever 172 in this guiding position functions to guide the inserted disk cartridge 28 toward the data transfer position so as not to hit the lower transducer head 42. The collision of the disk cartridge with the lower transducer head is particularly undesirable because it, as well as the upper transducer head 46, is gimbal supported in the illustrated embodiment of our invention.

The inserted disk cartridge 28 will come into engagement with the depending abutment 224, FIG. 12, of the cam 170 immediately before reaching the data transfer position. Pushed by the disk cartridge 28, the cam 170 will pivot against the bias of the torsion spring 218 to the angular position of FIGS. 13 and 15. The head control lever 168 is now conditioned for pivotal motion from the head retaining position of FIGS. 11 and 12 toward the head releasing position of FIGS. 14 and 16. Actually, however, the head control lever 168 does not pivot to the head releasing position until the clamp knob 40 is manipulated from the disengaging of the engaging position. The clamp arm 36 stays in the unclamping position of FIG. 3 before the manipulation of the clamp knob 40, so that its finger 226 holds the head control lever 168 in the head retaining position. The head arm 48 would remain in the retracted position of FIG. 3 even if the head control lever 168 were not engaged by the clamp arm finger 226, because the head arm pin 164 would then still rest on the clamp arm 36 being held in the unclamping position as in FIG. 3.

The user is advised to turn the clamp knob 40 from the disengaging position of FIGS. 1 and 5 to the engaging position of FIGS. 2 and 6 following the insertion of the disk cartridge 28. He may have failed to fully insert the disk cartridge, leaving a certain trailing end portion thereof projecting out of the entrance slot 24. If the length of this projecting end portion of the disk cartridge is less than a limit determined by the shape, size and position of the pusher 114 on the clamp knob 40, the disk cartridge will become loaded fully by the subsequent minpulation of the clamp knob from the disengaging to the engaging position, as the sloping edge 116 of the pusher slidingly engage and push the cartridge into the apparatus 20. The nonsloping edge 118 of the pusher 114 will serve to hold the disk cartridge fully received in the apparatus.

With the pivotal motion of the clamp knob 40 from the disengaging to the engaging position, the crankpin 126 on the crankweb 124 will slide from one extremity of the slot 142 in the lever 128 to the other thereby causing the lever 128 to pivot through the required angle about the pin 130. The pin 132 on the distal end of the lever 128 will then act on the lower lateral projection 146 of the clamp arm 36 to force same from the unclamping position of FIG. 3 to the clamping position of FIG. 4 against the force of the cantilever spring 98.

In the clamping position of the clamp arm 36 the conical collet 88 of the clamp assembly 34 will become engaged in the socket 84 in the drive hub 80 through the central aperture 58, FIG. 7, in the flexible magnetic disk 52 of the loaded disk cartridge 28. Further the exposed annular portion of the magnetic disk 52 will become captured between the annular surface 86 of the drive hub 80 and the flange 90 on the collet 88. At the same time with such engagement of the magnetic disk 52 between drive hub assembly 30 and clamp assembly 34, the clamp arm 36 on its travel to the clamping position will act on the lug 200 of the cartridge guide lever 172, causing its pivotal from the guiding position of FIG. 12 to the nonguiding position of FIG. 15 against the bias of the compression spring 174. Thus is the magnetic disk 52 clamped in the data transfer position.

Figure 15:
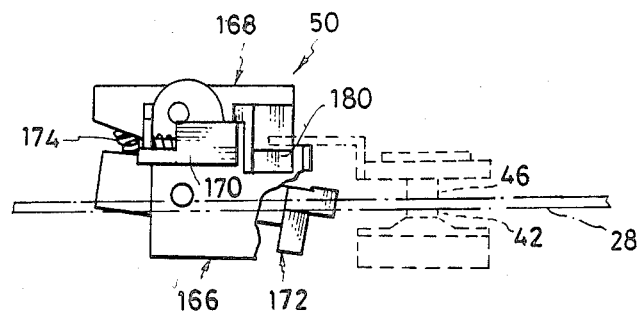
FIG. 15 is a view similar to FIG. 12 except that the head control lever and the cartridge guide lever are shown in the same positions as in FIG. 13.

Still further, upon pivotal motion of the clamp arm 36 to the clamping position, the head control lever 168 will be sprung from the head retaining position of FIG. 12 to the head releasing position of FIG. 15, the cam 170 having previously been turned by the inserted disk cartridge to allow such displacement of the head control lever. Now the head arm 48 can be pivoted from the retracted position of FIG. 3 to the working position of FIG. 4 under the forces of the springs 154 and 162. As the upper transducer head 46 thus makes data transfer contact with the upper face of the magnetic disk 52, so does the lower transducer head 42 with the lower face of the magnetic disk.

It is understood that the compression spring 174 between head control lever 168 and cartridge guide lever 172 is stronger than the torsion spring 218 acting on the cam 170. Consequently, once turned to the FIG. 15 position by the loaded disk cartridge 28 against the force of the torsion spring 218, the cam 170 will stay in that position during the subsequent process of data transfer and so will not in any way interfere with the rotation of the magnetic disk 52.

For the withdrawal of the disk cartridge 28 following a required run of data transfer between apparatus 20 and magnetic disk 52, the user may turn the clamp knob 40 from the engaging position of FIGS. 2 and 6 back to the disengaging position of FIGS. 1 and 5 for causing the clamp assembly 34 to disengage the magnetic disk 52. The crankpin 126 of the clamp actuating mechanism 38 will then slide along the slot 142 in the lever 128 back to the initial position of FIG. 1. Thereupon the clamp arm 36 will be pivoted from the clamping position of FIG. 4 back to the unclamping position by FIG. 3 by the effect of the cantilever spring 98, by the manual actuating force exerted on the clamp knob 40, or by both. The clamp assembly 34 will move out of engagement with the drive hub assembly 30 upon return of the clamp arm 36 to the unclamping position. The head arm 48 will also return to the FIG. 3 position against the forces of the springs 154 and 162, moving the upper transducer head 46 out of data transfer contact with the magnetic disk 52.

Figure 13:
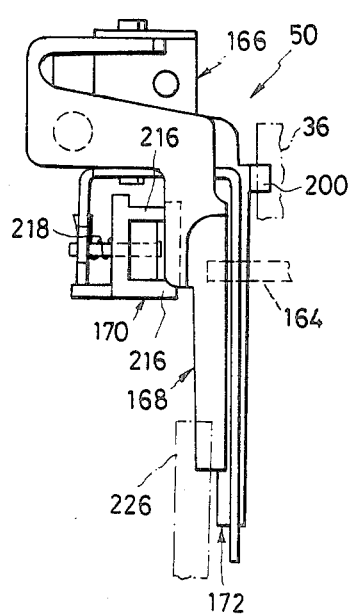
FIG. 13 is a view similar to FIG. 10 except that the head control lever is shown cam actuated to the head releasing position, and the cartridge guide lever shown actuated to the nonguiding position.
Figure 14:
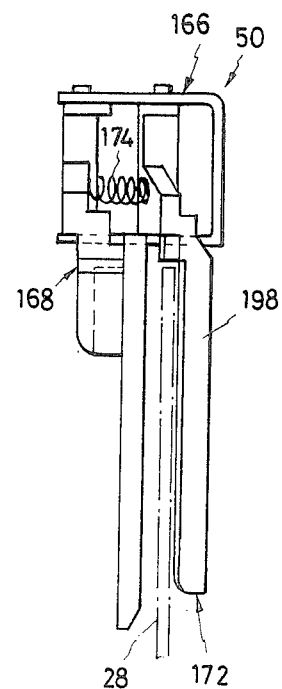
FIG. 14 is a view similar to FIG. 11 except that the head control lever and the cartridge guide lever are shown in the same positions as in FIG. 13.

Further, with the return of the clamp arm 36 to the unclamping position, the cartridge guide lever 172 will pivot from its nonguiding position of FIGS. 13 through 15 to the guiding position of FIGS. 10 through 12 under the bias of the compression spring 174, thereby lifting the disk cartridge 28 out of contact with the lower transducer head 42 as in FIG. 12.

Still further, as the clamp arm 36 returns to the unclamping position as above, the head control lever 168 will be raised by its finger 226 from the head releasing position of FIGS. 13 through 15 back to the head retaining position of FIGS. 10 through 12. Then the disk cartridge 28 may be manually pulled out of the entrance slot 24. The cam 170 will return to the initial position of FIGS. 10 and 12 owing to the force of the torsion spring 218 under withdrawal of the disk cartridge 28.

As may have been understood from the foregoing disclosure, the head control mechanism 50 of the data transfer apparatus 20 inhibits the travel of the upper transducer head 46 into contact with the lower transducer head 42 in spite of the inadvertent manipulation of the clamp knob 40 to the engaging position, if then the disk cartridge 28 has not been loaded in the apparatus. However, the head control mechanism does not permit the actuation of the clamp assembly 34 into enagagement with the drive hub assembly 30 even if the disk cartridge 28 is not loaded. These functional features are desirable for the reasons we have set forth already.

Structurally, too, we wish to point out some of the advantages gained by the illustrated embodiment. One is that both head control lever 168 and cartridge guide lever 172 have the U shaped base portions 192 and 202, complete with the trunnions 196 and 206, that are capable of elastic deformation to expedite the pivotal mounting of the levers on the lever support 166. Another structural advantage is that the head control lever 168 and cartridge guide lever 172 are biased in the prescribed directions by the single compression spring 174 acting between their base portions. These structural features combine to reduce the number of the component parts of the head control mechanism, to simplify its construction, and to make its assemblage easy.

Although we have shown and described our invention in terms of but one embodiment thereof, we recognize, of course, that our invention is not to be limited by the exact details of this disclosure. A variety of modifications and adaptations will readily occur to one skilled in the art within the broad teaching hereof. For example, instead of being mounted to the pivotal clamp arm 36, the clamp assembly 34 may be mounted to a fixed shaft in axial alignment with the drive hub assembly 30, so as to be moved up and down along the shaft by suitable actuating means. It is also unessential that the clamp assembly be moved into and out of engagement with the drive hub assembly by the clamp knob 40 or by any other hand operated means. An obvious alternative to such hand operated means is a solenoid, which will make possible the pushbutton actuation of the clamp assembly.

All these and other alterations of the invention are intended in the foregoing disclosure; therefore, our invention is to be limited only by the terms of the claims which follow.

We claim:

1. A data transfer apparatus for use with a magnetic disk cartridge having a magnetic disk rotatably enclosed in an apertured, protective envelope, the apparatus comprising:
   (a) a housing having an entrance opening for the insertion and withdrawal of the disk cartridge to and from a predetermined data transfer position therein;
   (b) a drive hub assembly rotatably mounted within the housing in a concentric relation with the magnetic disk of the disk cartridge when the latter is in the data transfer position;
   (c) a clamp assembly disposed on the opposite side of the disk cartridge in the data transfer position with respect to the drive hub assembly;
   (d) a clamp actuating mechanism for actuating the clamp assembly between an unclamping position, where the clamp assembly is away from the drive hub assembly to allow the insertion and withdrawal of the disk cartridge into and from the housing, and a clamping position where the clamp assembly engages between itself and the drive hub assembly the magnetic disk of the disk cartridge in the data transfer position, the clamp assembly when the clamping position being rotatable jointly with the magnetic disk and the drive hub assembly about a common axis;
   (e) a first transducer head arranged on one side of the magnetic disk of the disk cartridge in the data transfer position;
   (f) a carriage having the first transducer head mounted thereon for transporting same radially of the magnetic disk of the disk cartridge in the data transfer position;
   (g) a second transducer head arranged on the opposite side of the disk cartridge in the data transfer position with respect to the first transducer head;
   (h) a head arm having the second transducer head mounted thereon and itself pivotally mounted on the carriage for movement between a retracted position, where the second transducer head is away from the disk cartridge in the data transducer position, and a working position where the second transducer head urges the magnetic disk of the disk cartridge against the first transfer head for the establishment of data transfer contact of the magnetic disk with both first and second transducer heads;
   (i) resilient means for biasing the head arm from the retracted toward the working position;
   (j) a head control mechanism for holding the head arm in the retracted position against the bias of the resilient means when the disk cartridge is not inserted in the housing, even if the clamp assembly is then actuated inadvertently from the unclamping to the clamping position by the clamp actuating mechanism, and for allowing the head arm to pivot on the carriage from the retracted to the working position under the bias of the resilient means in response to the actuation of the clamp assembly from the unclamping to the clamping position by the clamp actuating mechanism following the insertion of the disk cartridge in the housing toward the data transfer position, wherein the head control mechanism comprises:
   a head control lever operatively engaged with the head arm and movable between a head retaining position for retaining the head arm in the retracted position against the bias of the resilient means and a head releasing position for allowing the head arm to pivot under the retracted to the working position under the bias of the resilient means, the head control lever being held in the head retaining position when the clamp assembly is in the unclamping position, and being conditioned for movement from the head retaining position toward the head releasing position upon movement of the clamp assembly from the unclamping to the clamping position;
   second resilient means for biasing the head control lever from the head retaining position toward the head releasing position; and
   a cam for holding the head control lever in the head retaining position against the bias of the second resilient means when the disk cartridge is not inserted in the housing, the cam being adapted to be acted upon by the disk cartridge on insertion thereof to the data transfer position within the housing for conditioning the head control lever for movement from the head retaining position toward the head releasing position;
   the head control lever being movable from the head retaining position to the head releasing position under the bias of the second resilient means only when the disk cartridge is inserted to the head transfer position and the clamp assembly actuated to the clamping position; and
   (k) a lever support having a pair of confronting walls and fixedly mounted within the housing for pivotally supporting the head control lever, the head control lever comprising a base portion capable of elastic deformation, and a pair of trunnions extending from the base portion and rotatably received in a pair of holes defined one in each of the confronting walls of the lever support.

2. The data transfer apparatus as set forth in claim 1, wherein the lever support is made of metal, and the head control lever is molded of a plastic.

3. A data transfer apparatus for use with a magnetic disk cartridge having a magnetic disk rotatably enclosed in an apetured, protective envelope, the apparatus comprising:
   (a) a housing having an entrance opening for the insertion and withdrawal of the disk cartridge to and from a predetermined data transfer position therein;
   (b) a drive hub assembly rotatably mounted within the housing in a concentric relation with the magnetic disk of the disk cartridge when the latter is in the data transfer position;

(c) a clamp assembly disposed on the opposite side of the disk cartridge in the data transfer position with respect to the drive hub assembly;

(d) a clamp actuating mechanism for actuating the clamp assembly between an unclamped position, where the clamp assembly is away from the drive hub assembly to allow the insertion and withdrawal of the disk cartridge into and from the housing, and a clamping position where the clamp assembly engages between itself and the drive hub assembly the magnetic disk of the disk cartridge in the data transfer position, the clamp assembly when in the clamping position being rotatable jointly with the magnetic disk and the drive hub assembly about a common axis;

(e) a first transducer head arranged on one side of the magnetic disk of the disk cartridge in the data transfer position;

(f) a carriage having the first transducer head mounted thereon for transportating same radially of the magnetic disk of the disk cartridge in the data transfer position;

(g) a second transducer head arranged on the opposite side of the disk cartridge in the data transfer position with respect to the first transducer head;

(h) a head arm having the second transducer head mounted thereon and itself pivotally mounted on the carriage for movement between a retracted position, where the second transducer head is away from the cartridge in the data transfer position, and a working position where the second transducer head urges the magnetic disk of the disk cartridge against the first transducer head for the establishment of data transfer contact of the magnetic disk with both first and second transducer heads;

(i) resilient means for biasing the head arm from the retracted toward the working position;

(j) a head control mechanism for holding the head arm in the retracted position against the bias of the resilient means when the disk cartridge is not inserted in the housing, even if the clamp assembly is then actuated inadvertently from the unclamping to the clamping position by the clamp actuating mechanism, and for allowing the head arm to pivot on the carriage from the retracted to the working position under the bias of the resilient means in response to the actuation of the clamp assembly from the unclamping to the clamping position by the clamp actuating mechanism following the insertion of the disk cartridge in the housing toward the data transfer position, wherein the head control mechanism comprises:

a head control lever operatively engaged with the head arm and movable between a head retaining position for retaining the head arm in the retracted position against the bias of the resilient means and a head releasing position for allowing the head arm to pivot from the retracted to the working position under the bias of the resilient means, the head control lever being held in the head retaining position when the clamp assembly is in the unclamping position, and being conditioned for movement from the head retaining position toward the head releasing position upon movement of the clamp assembly from the unclamping to the clamping position;

second resilient means for biasing the head control lever from the head retaining position toward the head releasing position; and a cam for holding the head control lever in the head retaining position against the bias of the second resilient means when the disk cartridge is not inserted in the housing, the cam being adapted to be acted upon by the disk cartridge on insertion thereof to the data transfer position within the housing for conditioning the head control lever for movement from the head retaining position toward the head releasing position;

the head control lever being movable from the head retaining position to the head releasing position under the bias of the second resilient means only when the disk cartridge is inserted to the head transfer position and the clamp assembly actuated to the clamping position; and (k) a cartridge guide lever pivotally mounted within the housing for movement between a guiding position, where the disk cartridge on insertion through the entrance opening in the housing is guided to the data transfer position so as to avoid collision with the first transducer head, and a nonguiding position where the disk cartridge is allowed to make data transfer contact with the first transducer head, the cartridge guide lever being held in the guiding position when the clamp assembly is in the unclamping position, and being pivoted to the nonguiding position upon movement of the clamp assembly to the clamping position;

(l) a lever support fixedly mounted within the housing for pivotally supporting the head control lever and the cartridge guide lever, the lever support having a pair of confronting walls in which there are defined first and second registered pairs of holes;

(m) the head control lever comprising a base portion capable of elastic deformation, and a pair of trunnions extending from the base portion and rotatably engaged in the first pair of holes in the confronting walls of the lever support; and (n) the cartridge guide lever comprising a base portion capable of elastic deformation, and a pair of trunnions extending from the base portion of the cartridge guide lever and rotatably engaged in the second pair of holes in the confronting walls of the lever support.

4. The data transfer apparatus as set forth in claim 3, wherein the second resilient means comprises a spring acting between the head control lever and the cartridge guide lever for biasing the head control lever from the head retaining position toward the head releasing position and for biasing the cartridge guide lever from the nonguiding toward the guiding position, the cartridge guide lever being held in the guiding position under the bias of the second resilient means when the clamp assembly is in the unclamping position, and being pivoted to the nonguiding position against the bias of the second resilient means upon movement of the clamp assembly to the clamping position.

5. The data transfer apparatus as set forth in claim 3, further comprising a fixed cartridge guide formed integral with the lever support, the fixed cartridge guide extending parallel to the cartridge guide lever and coacting therewith for guiding the disk cartridge to and from the data transfer position when the cartridge guide lever is in the guiding position.

* * * * *